W. D. EDWARDS.
METHOD OF AND APPARATUS FOR MAKING ICE.
APPLICATION FILED FEB. 12, 1917.

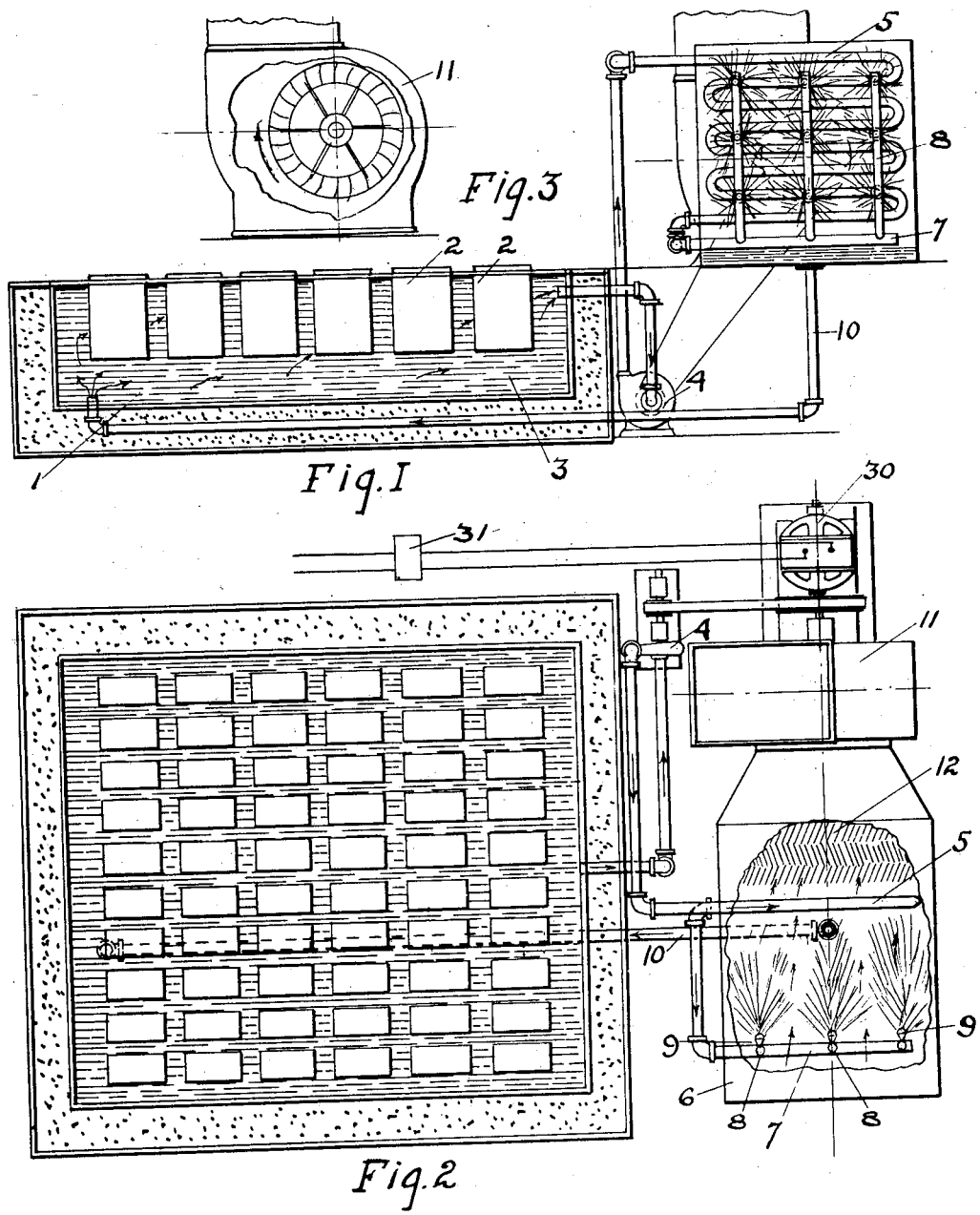

1,348,352.

Patented Aug. 3, 1920.
2 SHEETS—SHEET 2.

INVENTOR.
Wm. D. Edwards,
BY
Chamberlin Breedenreich
ATTORNEYS.

UNITED STATES PATENT OFFICE.

WILLIAM D. EDWARDS, OF MAYWOOD, ILLINOIS, ASSIGNOR OF ONE-HALF TO HARRY W. PAGE, OF MAYWOOD, ILLINOIS.

METHOD OF AND APPARATUS FOR MAKING ICE.

1,348,352.   Specification of Letters Patent.   Patented Aug. 3, 1920.

Application filed February 12, 1917. Serial No. 148,053.

*To all whom it may concern:*

Be it known that I, WILLIAM D. EDWARDS, a citizen of the United States, residing at Maywood, county of Cook, State of Illinois, have invented a certain new and useful Improvement in Methods of and Apparatus for Making Ice, and declare the following to be a full, clear, and exact description of the same, such as will enable other skilled in the art to which it pertains to make and use the same, reference being had to the accompanying drawings, which form a part of this specification.

My invention has for its object to produce a method of making ice and an apparatus for carrying out my method by which the cold of the outside air in winter may be utilized in a simple manner as the freezing medium in an ice plant which may be completely housed or inclosed.

A further object of my invention is to produce a simple and novel ice making plant which will make it possible to produce ice in any desired quantities and free from impurities whenever the weather is cold enough to freeze water in ponds and the like; thus securing the advantages of outdoor freezing, so far as the refrigerating medium is concerned, as well as the advantages which artificial ice plants have over natural ice plants.

A further object of my invention is to produce a simple and novel ice-making plant in which the cold of the outside air is utilized in such a way that the temperature of the freezing medium to which the water to be frozen is subjected is lower than the temperature of the outside air.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a vertical section through an ice-making plant arranged in accordance with a preferred form of my invention;

Fig. 2 is a top plan view of the plant shown in Fig. 1, with a portion of the wall of the cooling casing broken away;

Fig. 3 is a side view of a fan or blower by means of which a circulation of air is produced, a part of the casing being broken away;

Figure 4:
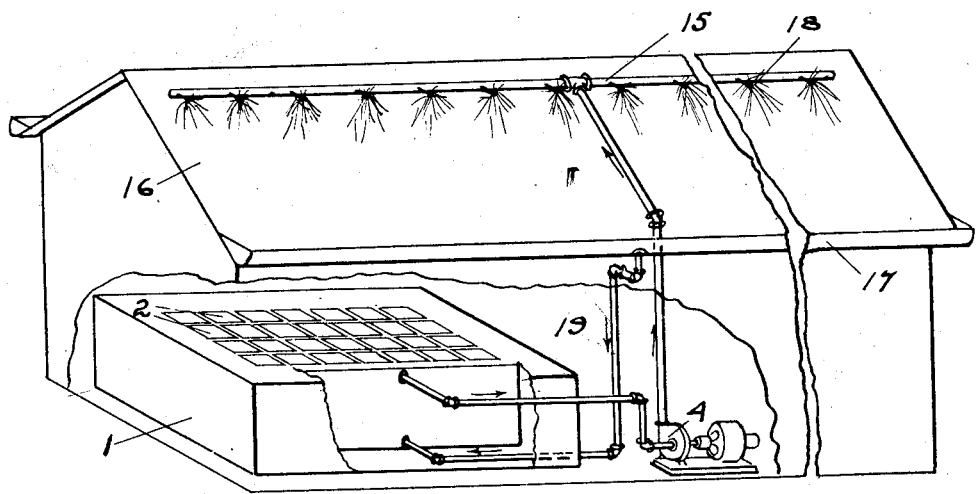
Fig. 4 is a perspective view of a second form of ice plant, including a building for housing the same, a portion of the walls of the building being broken away for the sake of showing the interior.

Referring to Figs. 1 to 3 of the drawings, 1 represents a shallow tank or vat of any suitable size and shape having preferably thick heat insulated walls. Detachably supported so as to extend downwardly into the tank or vat are individual containers, 2, each of which is of the size and shape that an individual cake of ice is to have. The tank or vat and the containers may be of any usual or suitable construction. The tank or vat is filled with brine, as indicated at 3, which comes in contact with the entire side and bottom surfaces of the containers.

The parts heretofore described may take any of those forms or constructions heretofore employed in artificial ice making. If the brine is made cold enough it will cause the water in the containers to congeal. In accordance with my invention, I cause the brine to be cooled by atmospheric air which may be caused to act on the brine in a variety of ways. In the arrangement shown in Figs. 1 and 2 of the drawings the brine is drawn from the upper levels of the tank by a suitable pump, 4, and is pumped through a coil, 5, housed in a suitable casing, 6; the coil 5 terminating in a header, 7, lying at some distance therefrom and having a series of branches, 8, lying in front of the coil and perforated or provided with spraying nozzles, 9, which causes the chamber in the casing 6 between the coil and the pipes 8 to be filled with a spray or mist while the pump is running. The brine falls to the bottom of the casing 6 and from there flows by gravity through a pipe, 10, into the bottom of the freezing tank. The casing 6 is open at its front end and at the rear end it is connected with the suction side of a fan or blower, 11. In the rear end of the casing, between the coil 5 and the fan are several rows of baffle plates, 12, so arranged that the air passing between them must follow a more or less circuitous path; these baffle plates being conveniently such as are commonly used in air washers for the purpose of causing the moisture held or carried in suspension with the air to be removed therefrom.

It will be seen that when both the fan and the pump are in operation, large volumes of air will be drawn through the casing 6, coming in contact with the briny spray and passing over the surfaces of the coil 5 which are kept wet by the spraying brine; the air on its way to the fan being relieved of surplus moisture by the baffle plates. The apparatus is of course so arranged, either by exposing the whole or a part of it to the outside air, or at least by making the inlet end of the casing 6 communicate with the outside air, that cold air will be drawn through the brine-cooling apparatus. Consequently if the outside air is below the freezing point of water it will cool the brine sufficiently to cause the latter to freeze the water in the containers in the freezing tank. A very valuable characteristic of my arrangement is that the brine may be made considerably cooler than the air which cools it, the difference in temperature depending upon the degree to which the ordinary atmospheric air is saturated and corresponding to the difference in the readings of wet and dry bulb thermometers.

In the arrangement just described, a cooling effect is produced directly upon the brine while it is in the form of a spray and also, as a preliminary step, indirectly through the walls of the coil 5 while it is flowing through this coil on its way to the spraying devices. In Fig. 4 I have illustrated a very simple arrangement in which no blower is employed but the discharge side of the pump is connected to a pipe, 15, extending lengthwise of the roof 16 of a building in which the plant is housed; the roof 16 being sloping and the pipe 15 being at the high side. Along the lower edge of the roof is a trough, 17. In this form of my invention the brine is sprayed directly into the atmospheric air through openings or nozzles, 18, associated with the pipe 15; the brine being cooled by contact with the air and flowing down into the trough or gutter, 17, from which it flows by gravity through a pipe, 19, to the freezing tank.

Figure 5:
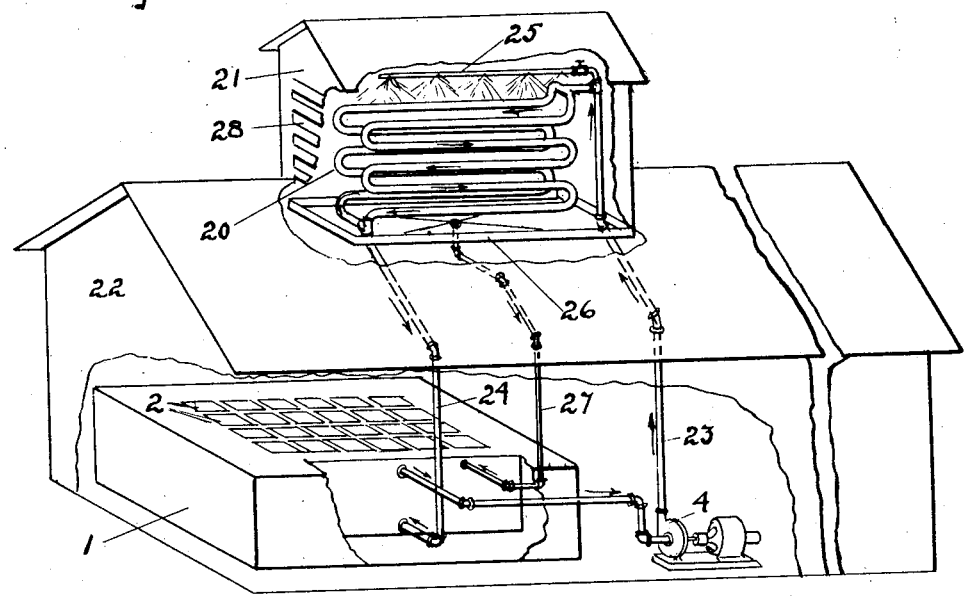
Fig. 5 is a view similar to Fig. 4, showing a still further modification.

In Fig. 5 I have illustrated an arrangement in which the cooling of brine flowing through coils whose exterior surfaces are wet and the cooling of the brine by direct contact of the air therewith are employed independently of each other except that the brine sprays are utilized for the purpose of keeping the coils wet. Of course the surfaces of the coils may be kept wet in any desired way in order to secure the reduction of temperature which results from the evaporation of moisture on an object over which non-saturated air passes; but the apparatus is simplified and its efficiency is perhaps increased by utilizing the brine itself as the medium for wetting the coils.

Referring to Fig. 5, 20 represents a double cooling coil arranged in a small housing or superstructure, 21, located on top of the building 22 in which the plant is housed. Brine is circulated through the coil which pumps it to coil through a pipe, 23, the brine flowing back to the freezing tank from the coil through a pipe, 24. At the point where the pipe 23 joins the coil there is a branch pipe, 25, lying above the coil; this branch pipe being perforated or provided with nozzles for the purpose of projecting a briny spray down over the coil. A suitable pan, 26, is placed beneath the coil for the purpose of collecting the brine discharged from the branch pipe 25; the brine flowing back to the freezing tank from a pan 26, through a pipe, 27. The housing 21 is made open at the sides or provided with adequate openings through which the atmospheric air can circulate.

In order to make the plants automatic, causing the pumps and fans or blowers, where the latter are employed, to run only while the temperature of the outside air is below a predetermined maximum, the propelling motor, 30, as illustrated in Fig. 2, may be provided with a thermally-controlled switch, 31, which will open the circuit of the motor whenever the outside air becomes too warm, thus shutting down the plant, and again close the circuit when the air becomes cool enough to produce a temperature in the brine low enough to freeze the water.

It will be seen that in all of the arrangements that I have illustrated no freezing element except that furnished by nature is required and the power plant is of the simplest consisting simply of a motor-driven pump or pump and fan and requiring substantially no attention except that of taking out chunks of ice and replenishing the supply of water. Consequently plants may be built in comparatively small units which may be even more widely distributed than are now the ponds from which ice is at present harvested in winter, making the ownership of a supply of ice entirely independent of the ownership of a pond or other body of water.

Although the main use to which my invention is put will probably be ice-making, my improved principle or method of refrigeration may of course be used for other purposes, the brine being cooled as heretofore described and carried to the apparatus which is to interchange heat between the brine and the thing to be cooled.

While I have illustrated and described with particularity only a few arrangements for carrying out my invention, I do not desire to be limited to the exact structural details thus illustrated and described; but intend to cover all forms and arrangements which come within the terms employed in the definitions of my invention constituting the appended claims. Furthermore, by the word "brine" I mean any fluid medium which will not solidify at the freezing point of pure water.

I claim:

1. The method of producing ice which consists in immersing a container for water to be frozen in a brine bath, circulating the brine through a heat interchanger having a wet exterior surface, and causing cold air to flow over said heat interchanger.

2. The method of producing ice which consists in immersing a container for water to be frozen in a brine bath, conveying the brine from the bath and subjecting it to a temperature produced by cold atmospheric air passing over a wet surface, and then returning the cooled brine to the bath.

3. An ice-making plant comprising a tank for containing brine, containers for water to be frozen adapted to be held in said tank, a cooling coil, means for keeping the surface of said coil wet, means for circulating the brine from said tank through said coil, and means for causing atmospheric air to pass across said coil.

4. An ice-making plant comprising a tank for containing brine, containers for water to be frozen adapted to be held in said tank, a cooling coil, means for circulating the brine through said cooling coil and for spraying brine upon said coil, means for causing atmospheric air to pass across said coil, and means for collecting the brine spread upon the coil and returning it to the tank.

5. An ice-making plant comprising a tank for containing brine, containers for water to be frozen adapted to be held in said tank, a cooling coil connected at one end to said tank, a spraying device connected to the other end of the cooling coil and positioned to throw a spray over the coil, means for forcing brine from the tank through said coil and said spraying device, and means for collecting the brine discharged from the spraying device and returning it to the tank.

6. An ice-making plant comprising a tank for containing brine, containers for water to be frozen adapted to be held in said tank, a cooling coil connected at one end to said tank, a spraying device connected to the other end of the cooling coil and positioned to throw a spray over the coil, means for forcing brine from the tank through said coil and said spraying device, means for collecting the brine discharged from the spraying device and returning it to the tank, and means for causing air to flow past the spraying device and then over said coil.

7. The method of refrigeration which consists in passing brine through a heat-interchanger, subjecting the brine to a temperature produced by cold atmospheric air passing over a wet surface, and returning the cooled brine to the heat-interchanger.

8. A refrigerating apparatus comprising a heat-interchanger, a cooling coil, means for keeping the surface of said coil wet, means for circulating brine from said heat-interchanger through said coil, and means for causing atmospheric air to pass across said coil.

In testimony whereof, I sign this specification.

WILLIAM D. EDWARDS.